United States Patent
Krien

(10) Patent No.: US 8,355,885 B2
(45) Date of Patent: Jan. 15, 2013

(54) COMPUTERIZED IMAGING OF SPORTING TROPHIES

(75) Inventor: David J. Krien, Hays, KS (US)

(73) Assignee: David Krien LLC, Hays, KS (US)

(*) Notice: Subject to any disclaimer, the term of this patent is extended or adjusted under 35 U.S.C. 154(b) by 780 days.

(21) Appl. No.: 11/170,573

(22) Filed: Jun. 29, 2005

(65) Prior Publication Data

US 2006/0002553 A1    Jan. 5, 2006

Related U.S. Application Data

(60) Provisional application No. 60/584,908, filed on Jul. 1, 2004.

(51) Int. Cl.
*G01B 7/00* (2006.01)
*G01B 5/02* (2006.01)

(52) U.S. Cl. ......... 702/155; 702/121; 702/122; 702/159

(58) Field of Classification Search .......... 702/121–123, 702/150–161; 356/3.07, 141.4; 382/318, 382/319; 446/268; 380/245
See application file for complete search history.

(56) References Cited

U.S. PATENT DOCUMENTS

| | | | | |
|---|---|---|---|---|
| 6,839,453 | B1* | 1/2005 | McWilliam et al. | 382/119 |
| 6,877,460 | B1* | 4/2005 | Ellis | 119/842 |
| 2002/0170201 | A1* | 11/2002 | Trout et al. | 33/773 |
| 2003/0024481 | A1* | 2/2003 | Kalscheur et al. | 119/174 |
| 2004/0023612 | A1* | 2/2004 | Kriesel | 452/157 |
| 2004/0157527 | A1* | 8/2004 | Omar | 446/268 |
| 2005/0123883 | A1* | 6/2005 | Kennen et al. | 434/11 |
| 2005/0153359 | A1* | 7/2005 | Schaefer et al. | 435/7.1 |
| 2005/0257748 | A1* | 11/2005 | Kriesel et al. | 119/51.02 |
| 2006/0005460 | A1* | 1/2006 | Bittrick | 43/43.4 |

OTHER PUBLICATIONS

FastSCAN Handheld Laser Scanner website www.polhemus.com.

* cited by examiner

*Primary Examiner* — Phuong Huynh
(74) *Attorney, Agent, or Firm* — Hall Estill Law Firm

(57) ABSTRACT

A method of generating and storing three-dimensional digital data indicative of a sporting trophy is provided. The method may be implemented in relation to a wide variety of sporting trophy applications. A sportsman can provide a sporting trophy to a scanning system to obtain three-dimensional image data relative to the sporting trophy. Sporting-relevant measurements can be computed based on the stored three-dimensional image data.

13 Claims, 6 Drawing Sheets

COMPUTERIZED IMAGING OF SPORTING TROPHIES

CROSS REFERENCE TO RELATED APPLICATION(S)

The present application is based on and claims the benefit of U.S. provisional patent application Ser. No. 60/584,908, filed Jul. 1, 2004, the content of which is hereby incorporated by reference in its entirety.

BACKGROUND OF THE INVENTION

Devices are known for creating three dimensional ("3D") image representations of items having complex shapes. For example, ShapeGrabber Inc. of Ottawa, Ontario, Canada designs, manufacturers and markets 3D laser scanners and 3D laser digitizers for 3D inspection, modeling and reverse engineering. The same company provides scanner services on a project basis. Because of their high-tech and costly nature 3D imaging systems, such as ShapeGrabber, are generally limited to industrial and business applications due to their higher cost.

The technology that the typical sportsman (e.g., a hunter, a trapper, a fisherman) possesses is generally limited to much less costly devices, such as Global Positioning System (GPS) systems. Further, in the process of recording and display of sporting trophies, or portions thereof, sportsmen generally rely on relatively primitive means such as having a mount of the original animal, or portion thereof, created. Further, sportsmen often use hand measurements to implement trophy scoring systems for comparison, categorization, and/or ranking of their sporting trophy. As defined herein "sporting trophy" means any non-living biological specimen obtained by a sportsman while engaged in their sport.

Most sportsmen (e.g., hunters, fishermen) participate in their respective sports with the goal of catching or taking animals with specific characteristics. On the occasion of acquiring a trophy animal (e.g., a deer with a large set of antlers, a fish with a great weight and/or length), sportsmen typically seek to record and display their achievements. This is generally done through the use of "mounts" (i.e., taking the trophy to a taxidermist) of their sporting trophy and in some circumstances with the use of scoring systems for comparison and ranking. However, this process requires that the original, or at least a mold thereof, be utilized. Thus, in cases of intentional or accidental disposal (e.g., through destruction or theft) of the original sporting trophy, a sportsman is unable to replace the trophy with an identical copy. Additionally, if the sporting trophy is damaged or otherwise flawed, the resulting mount, or mold thereof, would also contain the defects of the original.

Another major aspect related to sporting trophies pertains to scoring and ranking systems. For many years, sportsmen have been utilizing scoring systems to establish a numerical basis for categorizing and ranking sporting trophies such as antlers (e.g., whitetail deer antlers, elk antlers, moose antlers). Examples of such systems, illustratively in the context of deer antlers, include the Boone and Crocket, and the Pope and Young Score Charts. Determining the score of a set of deer antlers using the Boone and Crockett Scoring system, as well as other scoring systems, generally comprises measuring various characteristics such as the length and spacing of each tine, and the length and circumference of the main rack beams. Further, many scoring systems for sporting trophies comprise a number of categories (e.g., typical and non-typical antlers), each of which may be scored differently. For example, antlers ranked in the "typical" categories are given a higher score for symmetry.

As a result, the process of measuring and scoring sporting trophies is very labor intensive and requires precise measurement. The determination of accurate and consistent scores is very time-consuming and difficult as a great number of characteristics must be taken into account. The implementation of conventional scoring systems by hand leads to the possibility of error and/or ambiguity resulting from human error and/or lack of precision. Thus, there exists a need to implement economical and consistent systems of scoring sporting trophies. Further, a consistent, economical, and precise means for reproduction and/or analysis of portions of animals for sportsmen is needed.

SUMMARY OF THE INVENTION

A method of generating and storing three-dimensional digital data indicative of a sporting trophy is provided. The method may be implemented in relation to a wide variety of sporting trophy applications. A sportsman can provide a sporting trophy to a scanning system to obtain three-dimensional image data relative to the sporting trophy. Sporting-relevant measurements can be computed based on the stored three-dimensional image data.

DETAILED DESCRIPTION OF THE PREFERRED EMBODIMENTS

Figure 1:
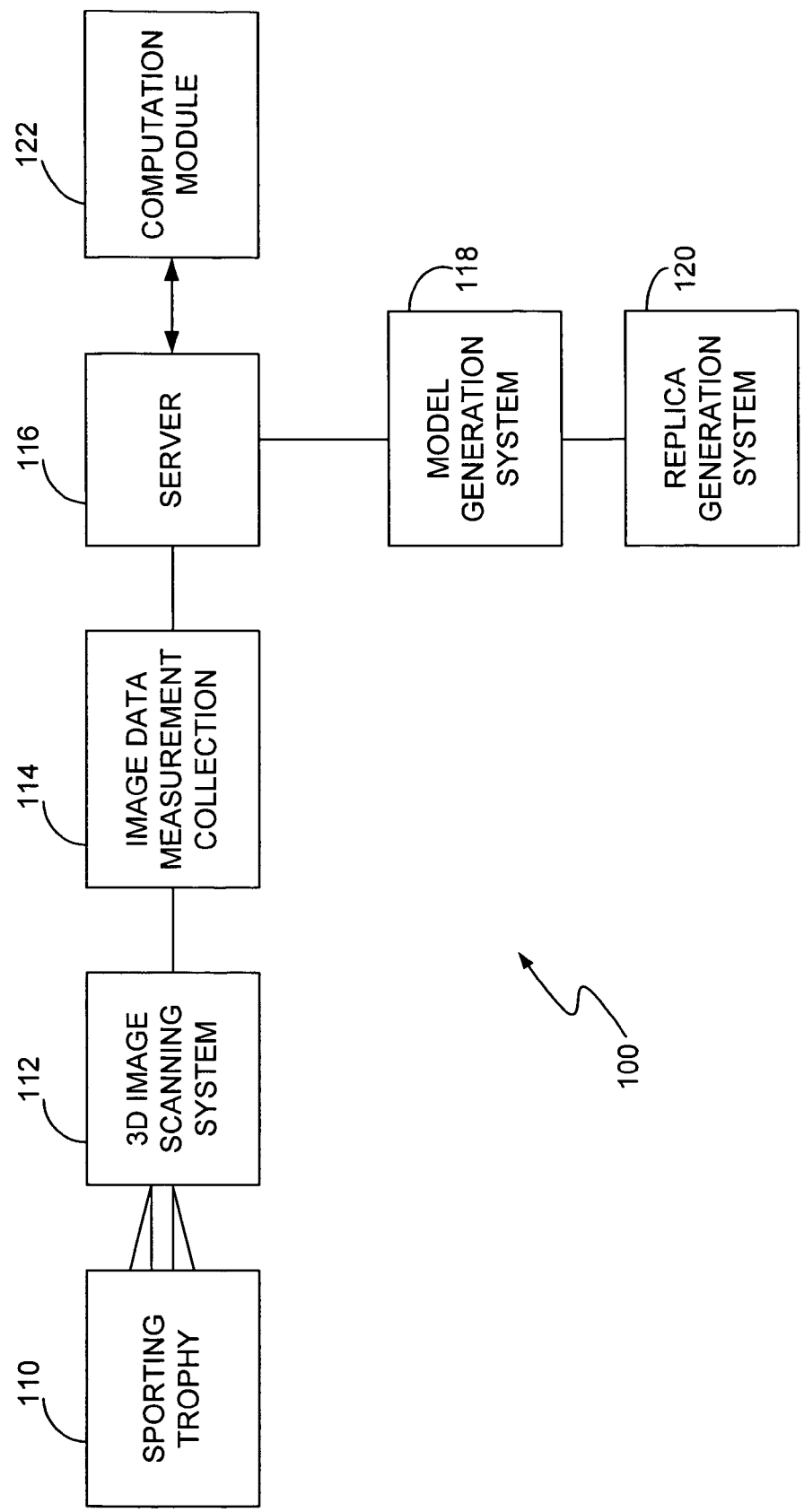
FIG. 1 is a block diagram of a system for obtaining digital data indicative of a sporting trophy.

In accordance with one embodiment of the present invention, FIG. 1 illustrates a system 100 pertaining to the imaging, reproduction and/or analysis of sporting trophy 110. For the purpose of economizing description of aspects of the present invention, many embodiments described herein will be discussed in the context of imaging, measurement, and reproduction of deer antlers. However, it should be understood that similar inventive concepts can be applied to other animals and/or other portions thereof.

In accordance with one aspect of the present invention, 3D image scanning system 112 creates a 3D representation of sporting trophy 110. In one embodiment, image scanning system 112 comprises a machine or service, such as those offered by ShapeGrabber, Inc., enabling a free-formed scan of surfaces associated with sporting trophy 110. Accordingly, a 3D representation of trophy 110 is generated. However, it is important to note that any suitable system can be employed to obtain 3D image data of sporting trophy 110.

After sporting trophy 110 has been reduced to digital image form, image data measurement 114 produces and collects precise measurements of the sporting trophy based on the image data. In accordance with one embodiment, a 3D grid is constructed around the sporting trophy in order to provide a context for precise measurement. In one embodiment, the grid is divided into measurement portions that are hundredths of an inch to scale.

In accordance with another embodiment of the present invention, after the image data has been collected, the image data is stored on a computerized server 116 for access as needed. Server 116 is one example of the three-dimensional image data being stored on a computer-readable medium. Other examples include storing the data on media such as a CD-ROM, or a memory stick, for example. In one aspect, the data on server 116 is accessible from remote locations, such as over the Internet. In another aspect, computation module 122 catalogs and ranks the image data in the context of previously stored data associated with other sporting trophies. For example, the sporting trophy can be ranked based on size or quality of incorporated features. Different sets of rankings can be generated for different categories such as geography, age of hunter, and the like. Further, the ranking of the antlers can be based, at least in part, on a selected scoring system.

In accordance with another embodiment of the present invention, the image data (or corresponding data derived therefrom) is supplied to a model generation system 118. Model generation is a machine or other suitable system that creates a model representation based on the image data. For example, distilled data, such as a vectorized representation of the sporting trophy in three-dimensional space using polar coordinates, can be generated based on the 3D image data. That distilled data, or the image data itself, can be provided to replica generation system 120, such as a Computer Numerically Controlled (CNC) cutting system in order to carve or otherwise machine a highly accurate representation of the originally scanned sporting trophy. In one aspect, the image data is copied from server 116 and provided to system 120 to create a model representation of the subject of the image data. It should be noted that the present invention is not limited to a CNC machine. Other devices such as plastic molding devices, plasma cutters and the like can be employed in accordance with embodiments of the present invention.

In accordance with another embodiment of the present invention, model generation system 118 can be utilized to correct damage or other imperfections in sporting trophy 110. In some instances, the sporting trophy may be damaged during the hunt or under other circumstances. For example, in the context of fishing, a fish may have been injured (e.g., bit by another fish) resulting in exterior blemishes. In these instances, the sporting trophy is less appealing or desirable because it is not in a pristine condition. Accordingly, model generation 118 may utilized to digitally correct flaws in the digital image of sporting trophy 110 before replica generation system 120 creates a replica of sporting trophy 110.

In accordance with another embodiment of the present invention, the 3D digital representation (or a corresponding data set based thereon) is provided to replica generation system 120 (e.g., a CNC (or another) machine) in order to create a negative image of the originally scanned object. In other words, a mold can be formed in a block of material. These molds can be utilized to create a synthetic representation for any purpose such as, but not limited to, the creation of candles in the shape of the antlers.

Figure 2:
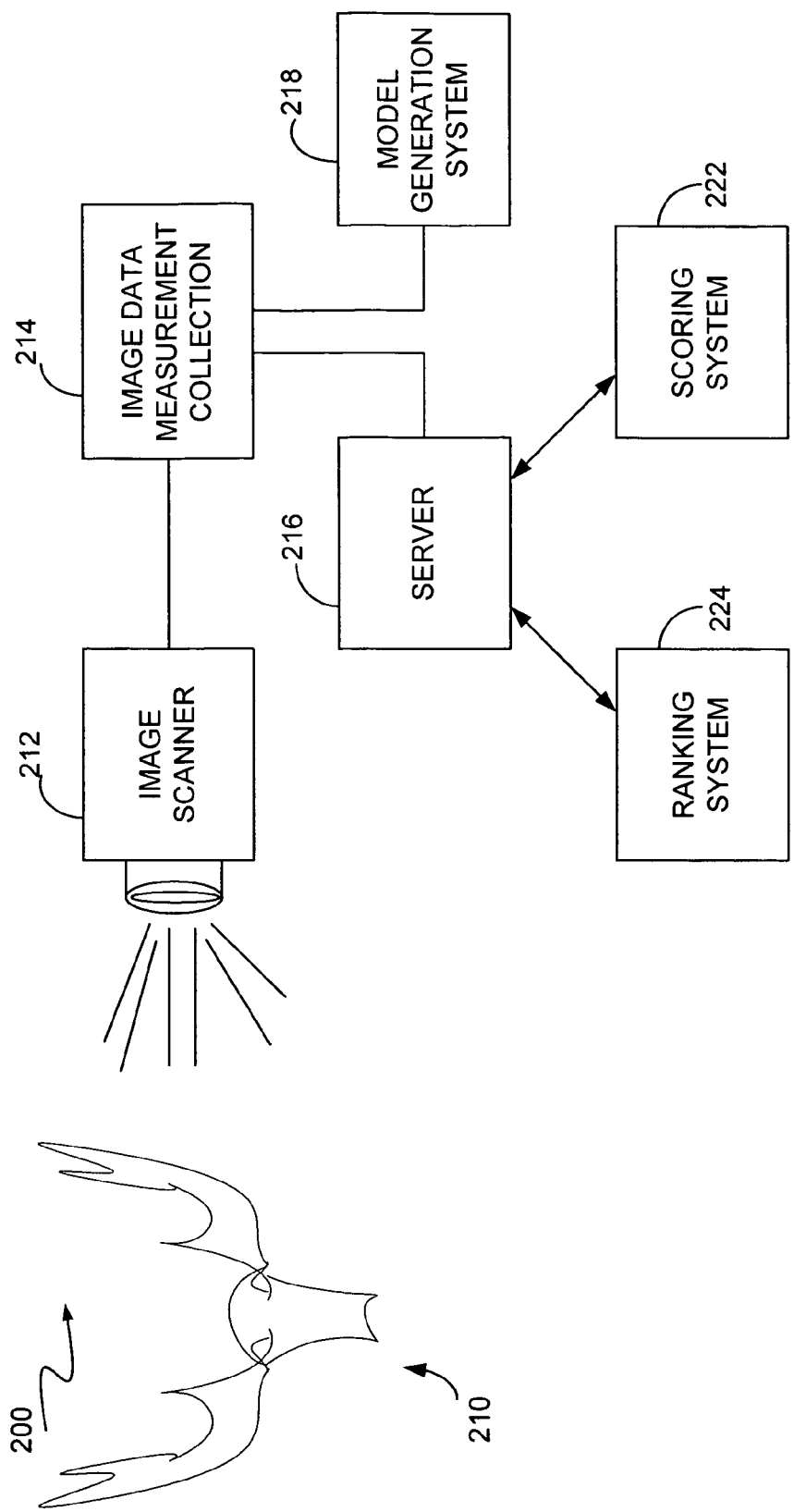
FIG. 2 is a block diagram illustrating a system for obtaining digital data indicative of a set of antlers.

FIG. 2 illustrates system 200 for the imaging, reproduction and/or analysis of deer antlers in accordance with one embodiment of the present invention. Antlers 210 are scanned by image scanner 212 and the resultant 3D image data are supplied to image data measurement and collection system 214. The image data corresponding to antlers 210 can be supplied to model generation system 218. Model generation is, illustratively, substantially similar to model generation system 118 described in the context of FIG. 1. In one embodiment, model generation system 218 is used to create a substantially exact replica of antlers 210. In one example, the antlers of the World Record Whitetail Deer are scanned in order to create a corresponding 3D image data set (e.g., an image data set accurate down to a hundredth of an inch relative to the original antler). The image data (or a corresponding set of image data) can be provided to a cutting machine, or other suitable machine, which is programmed to create a model of the originally provided antler.

In accordance with one embodiment of the present invention, the described duplication process will enhance the enjoyment of "shed hunting." Deer shed their antlers every year and it is common for people to hunt the sheds. If an individual who is shed hunting finds a large single of a pair of antlers, it becomes desirable for the individual to create a synthetic model of the other side of the pair of antlers. In this situation model generation system 218 can be utilized to reduce the found single antler to a 3D representation. That image data is then manipulated in order to create a data set that represents a relative mirror image representation of the originally scanned side of the found single antler. For example, if the individual found a right-hand side antler, a 3D data representation is produced for the left-hand side antler. Once an image data set has been created for the missing antler, the data can be utilized to create a model of the missing antler, or of the entire rack.

As discussed above, in the context of hunting, fishing, and other sports involving the capture or taking of animals, many systems are implemented to score, rank, and/or categorize sporting trophies. For instance, deer antlers are ranked by systems such as the Boone and Crocket and the Pope and Young Score Charts. In accordance with one embodiment of the present invention, the image data corresponding to antlers 210 are supplied to server 216. Server 216 may be any suitable computing system, implemented over a network or locally, for performing computation, sorting, and/or analysis of the image data. In one embodiment, scoring system 222 is utilized to implement a desired scoring system (e.g., Boone and Crocket Score Chart, Pope and Young Score Chart). It is important to note that any suitable scoring systems, such as simple size and weight measurements, are within the scope of the present invention. Additionally, specific sporting trophy measurements and scoring calculations can be performed using computed total volumetric displacement calculations as well as standard linear measurements. This automated total volumetric calculation can be performed with respect to any suitable sporting trophy and is not limited to antlers of horned animals. Any suitable method can be used to calculate the total volumetric displacement.

In accordance with another embodiment of the present invention, ranking system 224 enables a wider range of scoring of sporting trophies. Ranking system 224 can be locally implemented and provides ranking services for antlers that have been scanned by the same image scanner. However, ranking system 224 can also be implemented over a network, such as the Internet, to provide ranking services for large geographic area (e.g., county, state).

In accordance with yet another embodiment of the present invention, data can be divided into any of a number of sub-classes including state-by-state results, or for sporting categories such as 3/3, 4/4, 5/5, etc. Rankings can be provided on an Internet site that can be accessed by the public at large. In one embodiment, a centralized entity is responsible for the website and is the official organization for recording results. That organization creates the digital image representations for record keeping purposes. For example, the organization can provide an indication of a record for the largest 3/3, 4/4, 5/5, etc. in each individual state. In one embodiment, the record holder in each class in each state is provided with a reward. Given the centralized record keeping, there becomes an incentive for a hunter to bring his or her trophy to the organization for imaging and accurate measurement.

Figure 3:
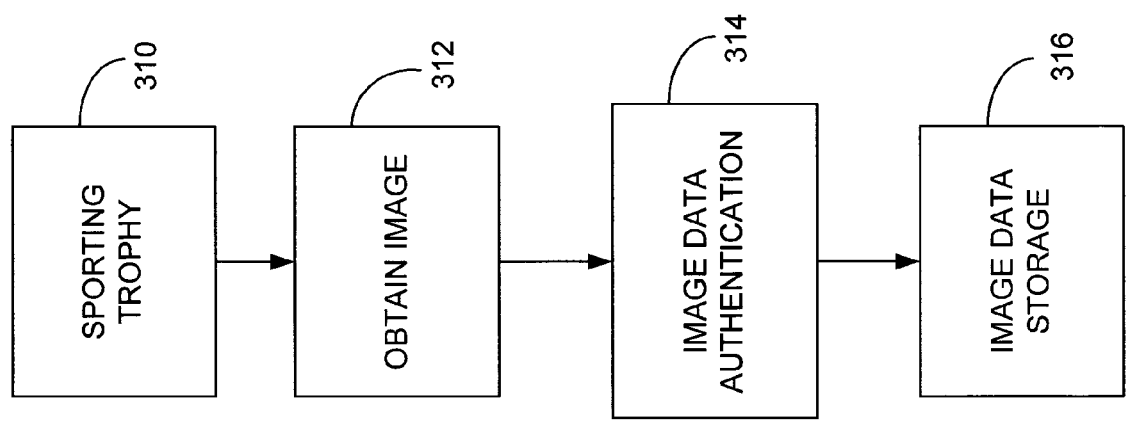
FIG. 3 is a flow diagram chart illustrating an embodiment of the present invention comprising authenticating image data obtained from a sporting trophy.

In accordance with one embodiment of the present invention, obtaining image data corresponding to a 3D scanned sporting trophy includes authenticating the image data. Illustrated in FIG. 3, a sporting trophy 310 is scanned and image data is obtained, as indicated at block 312. Image authentication 314 is created and issued relative to the digital image data of sporting trophy 310. Authentication can take any suitable form. Authentication may be as simple as placing a computer-readable medium containing the three-dimensional image data in a sealed package, which package is used to indicate authenticity. Additionally, the authentication can be provided in the form of digital data stored on the computer-readable medium. Yet another form of authentication can be provided by encrypting the three-dimensional data, and controlling access to keys for decryption to allowed persons such as the sportsman and/or approved taxidermists. Image data storage 316 may include storing the image authentication information along with the corresponding image data. In one embodiment, when the sportsman brings his or her sporting trophy for imaging and recordal, they are provided with a certificate of authenticity issued by the scanning entity. The certificate can include an image of the antlers along with information pertaining to the responsible hunter (e.g., social security number, hunting license number, etc) as well as relevant scanning data such as the date and time of scanning, machine used for scanning, technician information who performed the scan, etc.

It is believed that taxidermists may collectively form an alliance and an agreement to not mount antlers for hunters who do not have a certificate of authentication. This may even reduce poaching. In one aspect, even if the antlers were mounted by a taxidermist who does not require an authenticity certificate, purchasers of antlers will become accustomed to requiring certificates for enhanced value. In the long run, antlers not associated with a certificate will lose their value. The organization that issues these certificates of authenticity will be able to reissue certificates if necessary (e.g., if lost or stolen).

Figure 4:
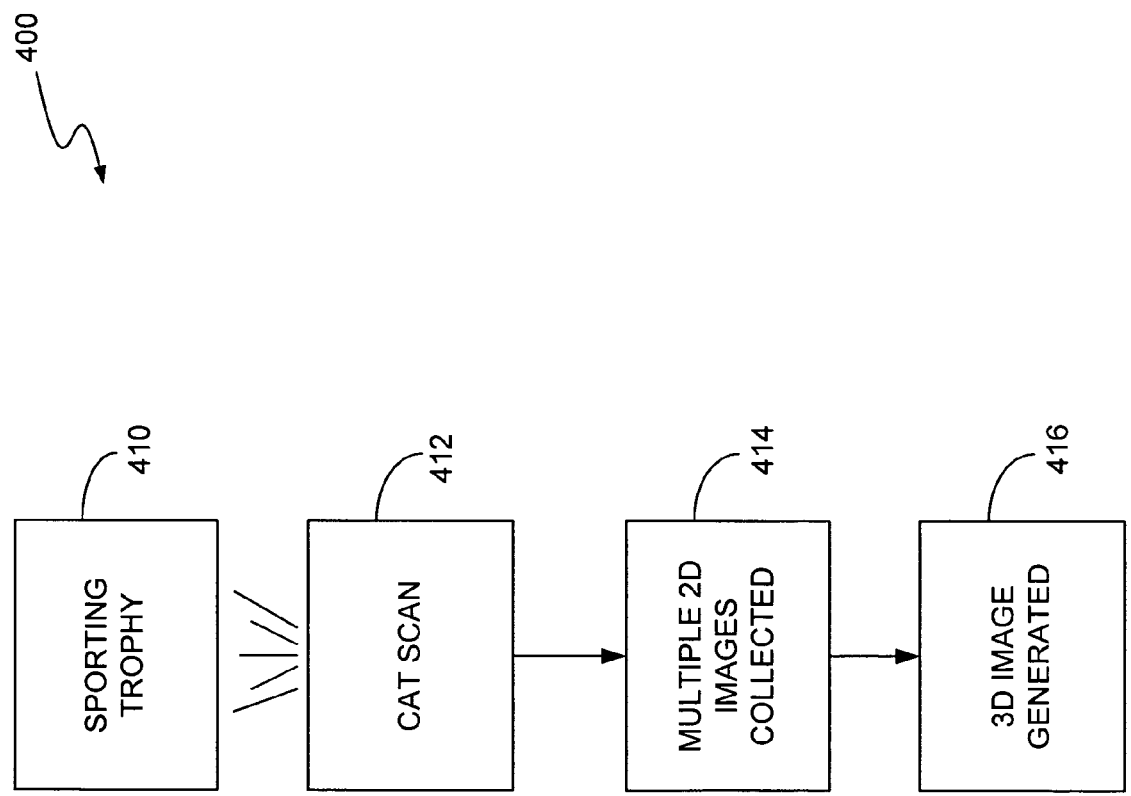
FIG. 4 is a flow diagram illustrating an embodiment of the present invention utilizing a CAT scan.

FIG. 4 is a diagrammatic view of a system that can be utilized to create a 3D image based on multiple two-dimensional ("2D") images in accordance with one embodiment of the present invention. First, a CAT (Computed Axial Tomography) scanned image 412 is conducted of a sporting trophy 410. A CAT scan involves using computers to generate multiple flat, (i.e., two-dimension) x-ray images one slice at a time. The multiple 2D images are collected (step 414) and used to generate a 3D image (step 416). The CAT scan images can be utilized to support a sportsmen-oriented scoring system based on bone structure, or any other suitable internal structure of the trophy. In one embodiment, such a process may be utilized for the scoring of fish. The image data generated from a CAT scan image can be utilized for any of the purposes described above in relation to the scanning equipment provided by ShapeGrabber Inc. For example, CAT scan images can be utilized as the basis for creating model representations of scanned objects. The scans can also be utilized for measurement purposes, the measurements being utilized in a record keeping system such as the ones described above in accordance with aspects of the present invention.

Figure 5:
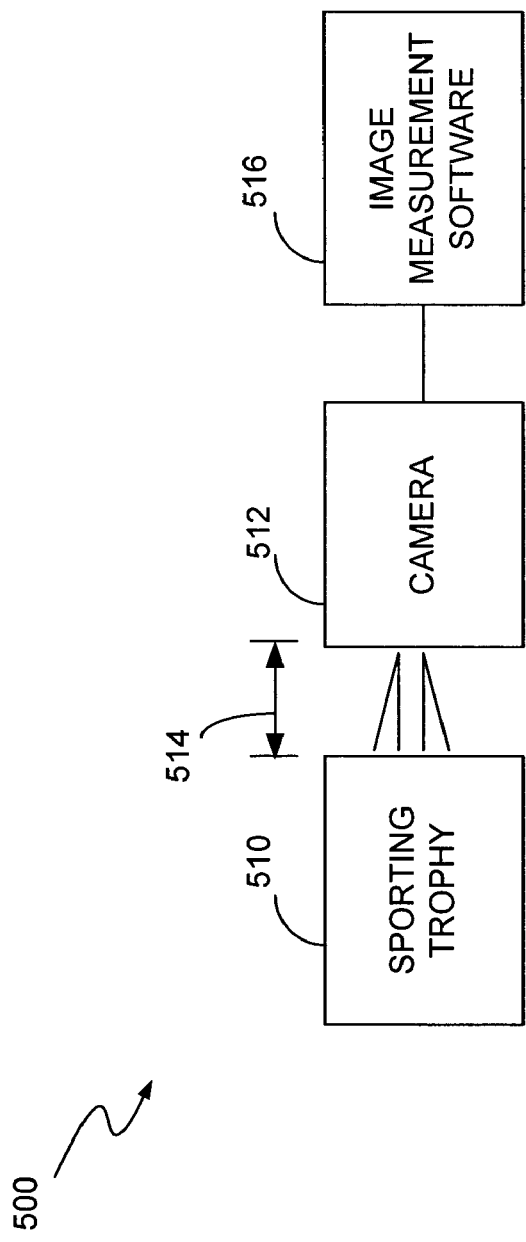
FIG. 5 is a block diagram illustrating an embodiment of the present invention utilizing a camera.

In another embodiment of the present invention, measurements are collected based on a plurality of two-dimensional images. FIG. 5 is a diagrammatic view of a camera 512 provided with a laser range finder. Camera 512 may be any suitable device or system for acquiring an image of sporting trophy 510. When a two-dimensional image of a target, illustratively sporting trophy 510, is collected, the distance 514 of camera 512 from the target is simultaneously obtained form the range finder. In accordance with one embodiment, image measurement software 514 can then be applied to measure an element in the picture (e.g., score a set of antlers) based, in part, on the distance 514 from the target 510. For example, if a hunter is standing six feet away from a target and takes a picture, the range finder will determine that the hunter is six feet away. The software can then analyze a picture taken by the hunter in the context of the distance from the target in order to produce a relatively exact measurement of something within the picture (e.g., the antlers).

In accordance with one embodiment of the present invention, the sportsman submits the sporting trophy (e.g. antlers) to a computerized imaging system. In some cases this may be convenient where the sportsman can simply bring the sporting trophy to the location of a scanning apparatus. However, in other situations, the sportsman and the scanning apparatus may be located hundreds if not thousands of miles from each other.

Figure 6:
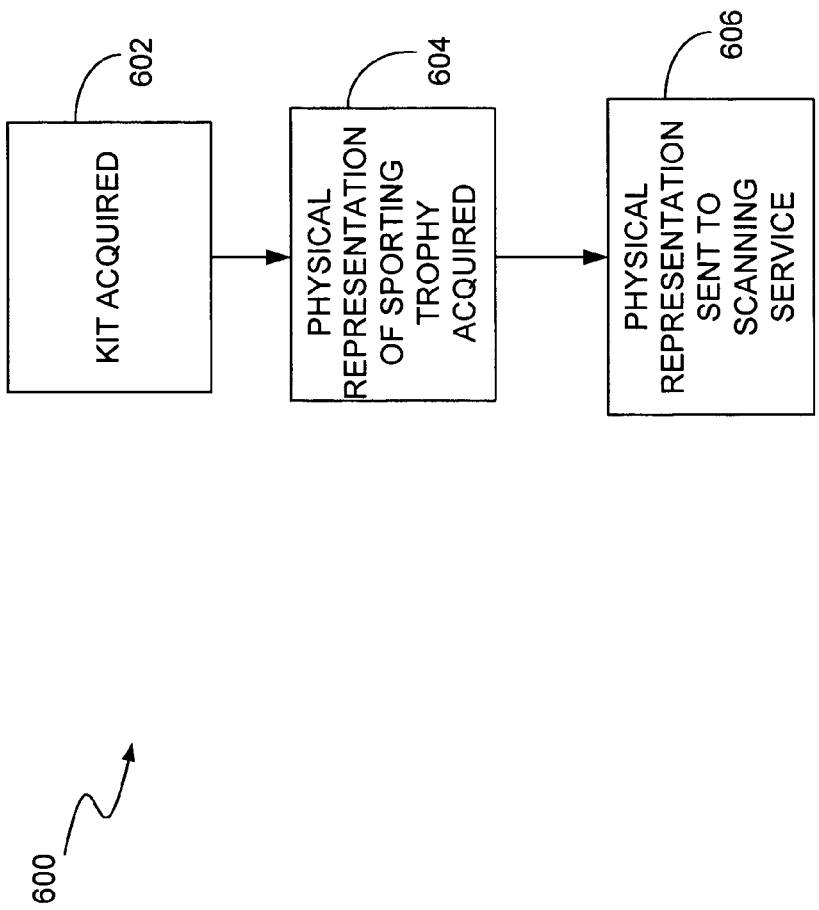
FIG. 6 is a flow chart illustrating an embodiment of the present invention utilizing a kit to acquire a physical representation of a sporting trophy.

FIG. 6 is a flow diagram of providing sporting trophy information to a scanning authority in accordance with an embodiment of the present invention. At block 602, a sportsman obtains a kit for acquiring a physical representation of a sporting trophy. The kit may comprise any means for creating a suitable representation of a sporting trophy. In one embodiment, the kit facilitates creation of a negative mold of the sporting trophy. For example, in one embodiment, the sportsman is provided with a molding compound and instructions to create a two-part kit that can form around the sporting trophy to generate a negative image thereof. In another embodiment, the kit includes a camera similar to that illustrated in FIG. 5. At block 604, the sportsman utilizes the kit to create a physical representation of the sporting trophy. Bock 604 can include the mixing or preparation of the molding compound; placement of the sporting trophy within the prepared molding compound; and caring of the molding compound; and curing of the molding compound. The physical representation (e.g., the hardened or cured negative image of the sporting trophy) can then be shipped to the scanning entity, as indicated at block 606 without requiring the sportsman to part with his or her sporting trophy. Those skilled in the art will recognize that other methods and techniques for providing a physical representation of the sporting trophy to the scanning entity can be provided as well.

Although the present invention has been described with reference to preferred embodiments, workers skilled in the art will recognize that changes may be made in form and detail without departing from the spirit and scope of the invention.

What is claimed is:

1. A method of generating digital data indicative of a sporting trophy, the method comprising:
   providing the sporting trophy to a computerized scanner, the sporting trophy being any non-living biological specimen obtained by a sportsman while engaged in their sport;
   engaging the scanner to enable a free-formed scan of surfaces associated with the sporting trophy;

generating three-dimensional image data indicative of the sporting trophy, the three-dimensional image data being a three-dimensional representation of the sporting trophy;

storing the three-dimensional image data on a computer readable medium; and generating a three-dimensional grid around the three-dimensional representation of the sporting trophy to provide a context for precise measurement, the three-dimensional grid divided into measurement portions that are sized to at least a hundredth of an inch.

2. The method claim 1, wherein the sporting trophy is at least a portion of a set of antlers.

3. The method of claim 1, and further comprising computing at least one sporting-relevant measurement from the three-dimensional data.

4. The method of claim 3, wherein the sporting-relevant measurement includes automatic calculation of volume of the sporting trophy.

5. The method of claim 3, and further comprising determining a score based on the at least one sporting-relevant measurement.

6. The method of claim 1, and further comprising generating authentication information corresponding to the digital data indicative of the sporting trophy.

7. The method of claim 6, wherein the authentication information is embodied on a certificate.

8. The method of claim 1, and further comprising generating a model of the sporting trophy from the stored three-dimensional data.

9. The method of claim 8, and further comprising manipulating the three-dimensional data prior to generating the model.

10. The method of claim 1, and wherein obtaining image data indicative of the sporting trophy comprises obtaining at least one two-dimensional image of the sporting trophy and at least one range measurement.

11. The method of claim 10, and further comprising generating a three dimensional image of the sporting trophy based on a plurality of two-dimensional images.

12. The method of claim 1, wherein providing the sporting trophy to the scanner includes providing a kit configured to generate a physical representation of the sporting trophy and wherein the physical representation is provided to the scanner.

13. A method of generating a score relative to a sporting trophy, the method comprising:

providing the sporting trophy to a computerized scanner, the sporting trophy being any non-living biological specimen obtained by a sportsman while engaged in their sport;

engaging the scanner to enable a free-formed scan of surfaces associated with the sporting trophy;

generating three-dimensional digital data representative of the sporting trophy, the three-dimensional image data being a three-dimensional representation of the sporting trophy;

storing the three-dimensional data on a computer readable medium;

generating a three-dimensional grid around the three-dimensional representation of the sporting trophy to provide a context for precise measurement, the three-dimensional grid divided into measurement portions that are sized to at least a hundredth of an inch;

computing predetermined sporting-relevant measurements from the three-dimensional representation of the sporting trophy and the three-dimensional grid; and computing a score based on the sporting-relevant measurements, the predetermined sporting-relevant measurements to compute provided by selected sporting trophy scoring systems.

* * * * *